United States Patent [19]

Bäckerud

[11] Patent Number: 5,328,502

[45] Date of Patent: Jul. 12, 1994

[54] METHOD FOR CONTROLLING AND REGULATING THE PRIMARY NUCLEATION OF IRON MELTS

[75] Inventor: Stig L. Bäckerud, Bloomfield Hills, Mich.

[73] Assignee: SinterCast AB, Stockholm, Sweden

[21] Appl. No.: 923,902

[22] PCT Filed: Feb. 25, 1991

[86] PCT No.: PCT/SE91/00144

§ 371 Date: Oct. 22, 1992

§ 102(e) Date: Oct. 22, 1992

[87] PCT Pub. No.: WO91/13176

PCT Pub. Date: Sep. 5, 1991

[30] Foreign Application Priority Data

Feb. 26, 1990 [SE] Sweden .................. 9000678-4

[51] Int. Cl.⁵ .................. C21C 1/08; C22C 33/08
[52] U.S. Cl. .................. 75/377; 164/4.1; 164/57.1; 420/31; 420/32; 420/33
[58] Field of Search .................. 164/4.1, 55.1, 56.1, 164/57.1, 58.1; 75/377; 266/79; 420/33, 31, 32

[56] References Cited

U.S. PATENT DOCUMENTS

| | | | |
|---|---|---|---|
| 3,360,364 | 12/1967 | Ivey et al. | |
| 3,617,259 | 11/1971 | Doliwa | |
| 4,046,509 | 9/1977 | Backerud | |
| 4,246,026 | 1/1981 | Stefanescu et al. | 75/377 X |
| 4,667,725 | 5/1987 | Backerud | 164/4.1 |
| 4,806,157 | 2/1989 | Subramanian | 164/57.1 X |
| 5,082,044 | 1/1992 | Christensen | 164/4.1 |

FOREIGN PATENT DOCUMENTS

| | | |
|---|---|---|
| 0004819 | 10/1979 | European Pat. Off. |
| 0030043 | 6/1981 | European Pat. Off. |
| 2245902 | 4/1974 | Fed. Rep. of Germany |
| 2554782 | 6/1977 | Fed. Rep. of Germany |
| 2753853 | 6/1979 | Fed. Rep. of Germany |
| 60-244845 | 12/1985 | Japan |
| 63-484 | 1/1988 | Japan ............... 75/377 |
| 152452 | 6/1985 | Norway |
| 8404579 | 5/1986 | Sweden |
| 2093071A | 8/1982 | United Kingdom |
| WO86/01755 | 3/1986 | World Int. Prop. O. |

*Primary Examiner*—J. Reed Batten, Jr.
*Attorney, Agent, or Firm*—Cushman Darby & Cushman

[57] ABSTRACT

A melt sample is taken in a sampling vessel which is in thermic equilibrium with the sample quantity prior to solidification commencing, the sampling vessel having been provided with at least one thermoelement and containing a determined and calibrated quantity of inoculating agent based on FeSi and sufficient to produce a maximum inoculating effect. The sample melt is allowed to solidify while temperature changes per unit of time are recorded. The difference between the minimum temperature in the undercooling phase, the maximum temperature in the eutectic reaction phase, and the eutectic equilibrium temperature $T_e$, are determined. To the base melt are added thermodynamically stable particles of the type spinels, oxides or oxysulphides of elements such as magnesium, aluminium, potassium, zirconium, strontium, titanium and rare earth metals when the difference between eutectic equilibrium temperature $T_e$ and the minimum temperature in the undercooling phase exceeds 10° K. and when the difference between $T_e$ and the maximum temperature in the eutectic reaction phase exceeds 5° K. If found suitable, these method steps are repeated until those differences fall beneath 10° K. and 5° K., respectively.

11 Claims, 1 Drawing Sheet

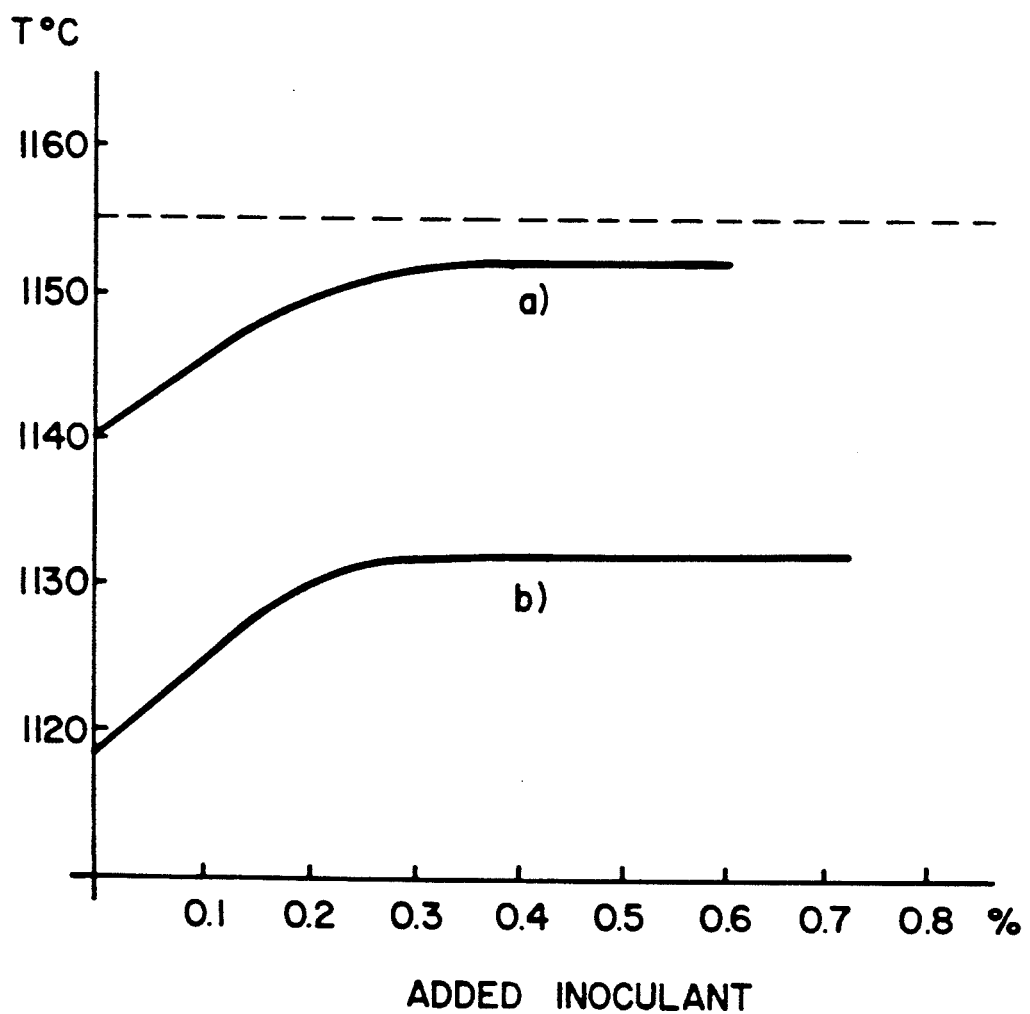

000# METHOD FOR CONTROLLING AND REGULATING THE PRIMARY NUCLEATION OF IRON MELTS

BACKGROUND OF THE INVENTION

The present invention relates to a method for controlling the solidification process of a casting melt, by determining the intrinsic crystallisation ability of a melt and making those corrections that are necessary.

When producing cast iron of all conceivable types, it is very important to check the number of graphite crystals formed per unit of volume. In white cast iron no graphite crystals are formed; mottled cast iron has a few graphite crystals; grey cast iron and cast iron with compact graphite have a moderate number of graphite crystals; and nodular iron normally has a large number of graphite crystals.

Consequently, a nucleation stimulant is introduced into the melt shortly before the casting process, in order to stimulate the formation of a desired number of graphite crystals. A large number of nucleation stimulants are commercially available, the majority of these stimulants being based on ferrosilicon (FeSi) or silicon carbide. Many of these stimulants contain so-called inoculating agents and also certain additive elements, such as calcium, strontium or zirconium, with the intention of amplifying the effect of the stimulants.

The effect produced by the inoculating agents is very shortlived, however, and these agents must therefore be added to the melt at a late stage of the casting process, often in the casting jets or even in the actual casting mould itself. It is obvious that the effect of such additives is difficult to monitor and control in a manner to achieve optimal results, since the inoculating effect achieved will vary from melt to melt, and therewith from product to product.

The mechanism through which nucleation of graphite crystals takes place in the presence of FeSi-particles (the substance is most normally added in the form of coarse granules having a size of 1-10 mm) is well described in the literature (see for instance Ch Wang and Fredrikson; 48th International Casting Congress in Varna, Bulgaria, 1981-10-4-7,255).

The carbon equivalent (i.e. C.E. = %C + %Si/4) will increase sufficiently in the diffusion zone that occurs when an FeSi-particle is dissolved in the melt for a graphite crystal to graphitize in the melt, provided that this small graphite crystal survives until its normal growth temperature has been reached (i.e. generally at a temperature $<1155°$ C.). Under such circumstances, the graphite crystal is able to develop into a flaky graphite crystal or a graphite nodule, depending upon the chemical environment prevailing in the iron melt. Whereas Wang and Fredrikson state that the formation of graphite crystals takes place through a homogenous nucleation process, several other authors, for instance Jacobs et al, Metals Technology, Mar. 1976, page 98 (page 102) state the opinion that the formation of graphite crystals is a heterogenous nucleation process. These authors have namely found in graphite crystals primary crystallisation nuclei which consist of complex oxides of such elements as calcium, magnesium and aluminium of the spinel type, which are thermodynamically stable and well dispersed in the melt. The present invention is based on the significance of these so-called primary nuclei.

The concentration of such primary nuclei in the base melts used in present day casting technology varies considerably, partly due to the starting material used; this starting material ranges from sponge iron, material recycled from the foundry concerned, to steel scrap and more or less well defined scrap purchased on the market.

The melting method used also plays an important part. Furnaces operate in accordance with different principles (for instance gas-fired or oil-fired cupola furnaces, light-arc furnaces and induction furnaces), which heat the base iron to different temperatures during the melting process. Furthermore, the furnace linings influence the sulphide, oxysulphide and oxide particles in the molten material. Consequently, the concentration of primary nuclei in the base melt will vary very widely, not solely from the one production line to the other, but also from batch to batch in one and the same production line.

It is known that many patent specifications disclose valuable information concerning the properties of a melt. SE-B-350 606 in particular teaches a method in which a sample of the melt is taken in a sampling vessel when casting aluminium and the temperature changes that take place in time as the melt solidifies are recorded with the aid of a thermoelement placed in the melt. These records are then used to anticipate crystallisation conditions on the basis of undercooling values, the slope of-different parts of the curve, and constant temperatures during the eutectic reaction. SE-B-444 817 teaches a method by means of which information concerning the properties of the melt can be obtained such as to be able to determine whether the melt will solidify as flaky graphite iron, as a compact graphitic iron or as nodular iron. This information is obtained with the aid of two thermoelements, one of which is placed in the melt in the centre of a sampling vessel and the other is placed in the melt in the proximity of the wall of said vessel.

SUMMARY OF THE INVENTION

According to the present invention there is provided a method for regulating the solidification process in the casting of iron, this method comprising the steps of determining the intrinsic crystallisation ability of a base iron melt and modifying this ability. This method is characterized by taking a melt sample in a sampling vessel which is in thermic equilibrium with the sample quantity prior to solidification commencing, the sampling vessel having been provided with at least one thermoelement and containing a determined and calibrated quantity of inoculating agent based on FeSi and sufficient to produce a maximum inoculating effect; allowing the sample melt to solidify while recording temperature changes per unit of time; determining the difference between the minimum temperature in the undercooling phase, the maximum temperature in the eutectic reaction phase, and the eutectic equilibrium temperature $T_e$; adding to the base melt thermodynamically stable particles of the type spinels or oxysulphides of elements such as magnesium, aluminium, potassium, zirconium, strontium, titanium and rare earth metals when the difference between eutectic equilibrium temperature $T_e$ and the minimum temperature in the undercooling phase exceeds 10K and when the difference between $T_e$ and the maximum temperature in the eutectic reaction phase exceeds 5K; and if found suitable repeating these method steps until the aforesaid difference falls beneath 10K and 5K respectively.

The formation of oxides and/or oxysulphides is promoted when sulphides are present in the melt, such as manganese sulphide. The oxides may be of the spinel type, for instance spinel $MgAl_2O_4$, or of the oxysulphide type, such as $Ce_2O_2S$.

When only one inoculant, such as FeSi, is added to a base graphite iron melt which contains only a very small amount of primary nuclei, practically no inoculating effect is obtained. The same applies when an inoculant consisting of spinels and/or oxysulphides is added to this base melt. However, if the relatively stable spinels and/or oxysulphides are added first and FeSi is added thereafter in conjunction with the casting process, a desired, controllable inoculating effect is obtained.

The inoculant added to the sampling vessel in a calibrated and determined quantity is preferably a known, commercially available inoculant, such as an inoculant of the type known as "Superseed", having a particle size of from 2–4 mm. The amount of inoculant added shall correspond, for instance, to 0.2% of the total weight of the sample, subsequent to filling the sampling vessel with molten iron to the rim of the vessel. The minimum temperature during the undercooling phase which releases the eutectic reaction, and the maximum temperature during the eutectic reaction, are then determined with the aid of temperature measuring devices, preferably thermoelements, placed in the sampling vessel. The melt will contain a sufficient number of primary crystallisation nuclei when the minimum temperature is less than 10K beneath the equilibrium temperature. In this context, the eutectic temperature has been defined as 1150° C. and the thermoelements have been calibrated accordingly.

If the measured minimum temperature is beneath these defined temperature limits, it is necessary to add a given, calibrated amount of primary nuclei to the melt. As a rule of thumb, it can be said that the amount of primary nuclei added to the melt is doubled for each further 5K interval by which the measured eutectic reaction temperature falls beneath the eutectic equilibrium temperature.

The method by which crystallisation nuclei are added can vary. Oxides and oxysulphides can be introduced to the melt through the medium of suitable fluxes, although a better result is obtained when the stable particles are formed directly in the melt to achieve optimal dispersion and wetting. Calcium, aluminium, magnesium, strontium, zirconium, cerium or other rare earth metals in elementary form can be introduced in accordance with injection metallurgical principles with the aid of an inert carrier gas containing a measured amount of oxygen, or metal powder can be mixed with a readily disassociated oxide, such as iron oxide, and introduced into the base melt in the casting stream or jet when transferring the melt to a holding furnace, or with the aid of a dipping ladle in the holding furnace. A more sophisticated method is one in which powder is enclosed in a tube of appropriate diameter and fed into the melt with the aid of a wire feeder.

Because of the high carbon activity, and therewith low oxygen potential, it may be difficult at times to achieve an effective oxide formation of the kind desired, by introducing additives directly to a cast iron melt.

One alternative is then to produce a master alloy having a high content of oxide/oxysulphide particles from a separate melt having a low carbon content, and to dilute this master alloy in the melt to be treated. This master alloy, which will preferably contain at least 100 times the desired final particle concentration, can be produced in different solid forms, for instance in pellet form or in the form of small moulded pieces or in wire form, and can be introduced into the melt with the aid of suitable devices.

The master alloy used will preferably contain less than 5% of metals other than iron, thus more than 95% iron, and is preferably introduced to the molten iron in a quantity smaller than 1% of the total amount of cast iron.

A master alloy is produced by adding the desired metals present in oxides or oxysulphides in an environment such that oxidation with oxygen or sulphur will take place, and consequently the carbon content should be as low as possible in order to prevent carbon present in the melt from having a negative influence on the oxidation process.

As beforementioned, when practising the inventive method of the present invention undercooling is measured with the aid of at least one thermoelement placed in the sample quantity taken from the melt. In this respect, it has been found important to use two thermoelements, one placed in the centre of the sample melt and the other close to the inner surface of the sample vessel wall, wherein the difference between the minimum temperature in the undercooling phase for the eutectic reaction and the eutectic equilibrium temperature is determined with the aid of the thermoelement placed in the proximity of the inner surface of the sample vessel. The difference between the eutectic equilibrium temperature and the maximum temperature in the eutectic reaction phase is determined with the aid of the thermoelement placed in the centre of the sample. Should inverse segregation take place to an extent such that exudation of melt occurs, this can be observed from the rapid increase in temperature that takes place in the melt and recorded on the thermoelement positioned close to the inner surface of the sample vessel. The occurrence of exudation is evidence of the fact that the melt is deficient in crystallisation nuclei. Consequently, thermo-dynamically stable particles of the type spinels or oxysulphides must be added to the melt in quantities larger than those otherwise motivated by the minimum temperature of the undercooling phase measured in the centre of the sample vessel. The sampling process can then be repeated until the exudation phenomenon ceases and the aforesaid temperature differences lie between 10K and 5K respectively. Exudation is essentially due to a deficiency of crystallisation nuclei in the melt, and when a skin of solidified iron is formed at the inner surface of the sample vessel, the skin will contract and the melt located inwardly of the skin will penetrate the skin and cause molten metal to be pressed out through the skin wall. The thermoelement positioned adjacent the inner wall of the sample vessel will therewith register an elevated temperature.

One important advantage afforded by the method of the present invention is that a base-inoculant of an FeSi-type can be used in combination with a modifying agent of the spinel or oxysulphide type. The base-inoculant is relatively inexpensive in comparison with a modifying inoculant.

BRIEF DESCRIPTION OF THE DRAWING

The following series of tests illustrate how the effect of inoculant additions can vary from one production line to another. This variation is shown in the drawing figure, which illustrates the effect obtained when adding an amount of inoculant to the melt, and also shows the minimum undercooling temperature which precedes the eutectic reaction.

EXAMPLES

Different quantities of a commercially available inoculant of the FeSi-type with an addition of strontium, "Superseed" were added to a base iron a) A base iron containing a sufficient quantity of primary nuclei A thermoanalysis of the undercooling temperature prior to the eutectic reaction gave the measurement values disclosed in the drawing figure where the minimum temperature is plotted as a function of the amount of inoculant added, expressed in percent by weight of the sample melt. It will be seen from curve a) that a full inoculating effect was measured with an addition of 0.2% inoculant and that the minimum temperature lies close to the eutectic equilibrium temperature, i.e. 1150–1155° C. A metallographic examination showed fully developed A-graphite or flaky graphite throughout the whole of the sample volume.

b) A base iron with an insufficiency of primary nuclei

The same type of inoculant was added as that according to curve a) above, although in this case the addition was made to a base iron melt having an insufficiency of primary nuclei, as illustrated in curve b), the minimum temperature in this case lying on a much lower level. The minimum temperature of the eutectic reaction will never reach those values characteristic of a well inoculated material of A-graphite type, irrespective of the amount of inoculant added. When adding 0.25% inoculant, the samples, when examined metallographically, showed a relative quantity of D-graphite, "undercooled graphite" reaching to 40–60% of the total amount of graphite in the sample.

It will be seen from the curves in the drawing figure that an addition of a given inoculant of the FeSi-type in quantities above 0.2% will not appreciably influence the inoculating effect.

It is possible on the basis hereof to devise a simple measuring method by means of which the concentration of primary crystallisation nuclei in the melt can be established. This measuring or assaying procedure is effected by first introducing a molten inoculant of the FeSi-type into the sample melt in an amount corresponding to at least 0.2%, and thereafter recording the minimum temperature prior to the eutectic reaction and the maximum temperature at the eutectic reaction and comparing the values obtained with the eutectic equilibrium temperature.

The concentration of primary crystallisation nuclei in the melt can then be adjusted, in accordance with the invention, so that conditions which are optimum for graphite precipitation in the melt casting process are obtained.

I claim:

1. A method for controlling solidification of cast iron from a melt having an intrinsic crystallisation ability, by determining and modifying that ability, said method comprising the steps of:
   (a) providing a sampling vessel having at least one thermoelement and containing a calibrated quantity of an inoculating agent based on FeSi and sufficient to produce a maximum inoculating effect in a given-quantity sample of a base iron melt.
   (b) obtaining said given-quantity sample and placing said sampling vessel in thermic equilibrium with said given-quantity sample prior to commencement of solidification of said sample;
   (c) allowing said sample to solidify in said vessel while recording temperature changes of said sample per unit time as sensed by said at least one thermoelement;
   (d) from the temperature changes sensed and recorded in step (c), determining;
      the difference between the minimum temperature in an undercooling phase present in said solidifying sample,
      the maximum temperature in an eutectic reaction phase present in said solidifying sample, and
      the eutectic equilibrium temperature $T_e$ of said solidifying sample; and
   (e) adding to said base melt thermodynamically stable particles of at least one spinel, oxide or oxysulphide of at least one element selected from the group consisting of magnesium, aluminium, potassium, zirconium, strontium, titanium and a rare earth metal, when the difference between the eutectic equilibrium temperature and the minimum temperature in the undercooling phase, as determined in step (d), exceeds 10° K. and the difference between the eutectic equilibrium temperature and the maximum temperature in the eutectic reaction phase, as determined in step (d) exceeds 5° K.

2. The method of claim 1, further including:
repeating steps (a)–(d) using as a base melt the base melt of step (a) as modified by having conducted steps (a)–(d), until said differences respectively fall beneath 10° K. and 5° K.

3. The method of claim 1, wherein:
the inoculating agent contained in said sampling vessel in step (a) is introduced thereunto in such a quantity that the sample which is to be subjected to step (c) accommodates at lest 0.2 percent inoculating agent by weight.

4. The method of claim 1, wherein:
in step (e), said thermodynamically stable particle of at least one spinel, oxide or oxysulphide are added said melt by immersing into said melt a wire or rod which consists essentially of an outer layer of iron enclosing said at least one element and a readily dissociated metal oxide.

5. The method of claim 4, wherein:
said readily dissociated metal oxide is iron oxide.

6. The method of claim 1, wherein:
in step (e), said thermodynamically stable particles of at least one spinel, oxide or oxysulphide are added said melt by injecting into said melt said at least one element in an inert gas, together with an oxidizing agent.

7. The method of claim 6, wherein:
said oxidizing agent is a readily dissociated oxide.

8. The method of claim 6, wherein:
said oxidizing agent is gaseous oxygen or air.

9. The method of claim 1, wherein:
said sample has a center and said sampling vessel has an inner surface, and in step (c), temperature changes of said sample per unit time are sensed by said at least one thermoelement and recorded in respect to said center of said sample and in said sample in the vicinity of said inner surface, and upon sensing that an inverse segregation has occurred of such magnitude that exudation occurs, as indicated by a rapid rise in temperature in said sample in the vicinity of said inner surface, steps (a)-(c) are repeated on successive samples using progressively increasing quantities of inoculating agent in step (a), until the said difference between the eutectic equilibrium temperature and the minimum temperature in the undercooling phase, as determined in step (d), is smaller than 10° K. and the difference between the eutectic equilibrium temperature and the maximum temperature in the eutectic reaction phase, as determined in step (d) is smaller than 5° K. and inverse segregation of such magnitude as to indicate occurrence of exudation does not occur.

10. The method of claim 1, wherein:
in step (e), said thermodynamically stable particles are delivered into said melt by first preparing primary nucleating particles of master alloy by forming at least one oxide or oxysulphide of said at least one element in a melt of iron having low carbon activity and a high concentration of iron, allowing this later melt to solidify, and forming particles thereof.

11. The method of claim 10, wherein said primary nucleating particles of master allow are at least 95 percent iron, by weight.

* * * * *